Nov. 10, 1953
D. M. DAVIS ET AL
2,659,013
BADGE METER
Filed Nov. 19, 1952
2 Sheets-Sheet 1
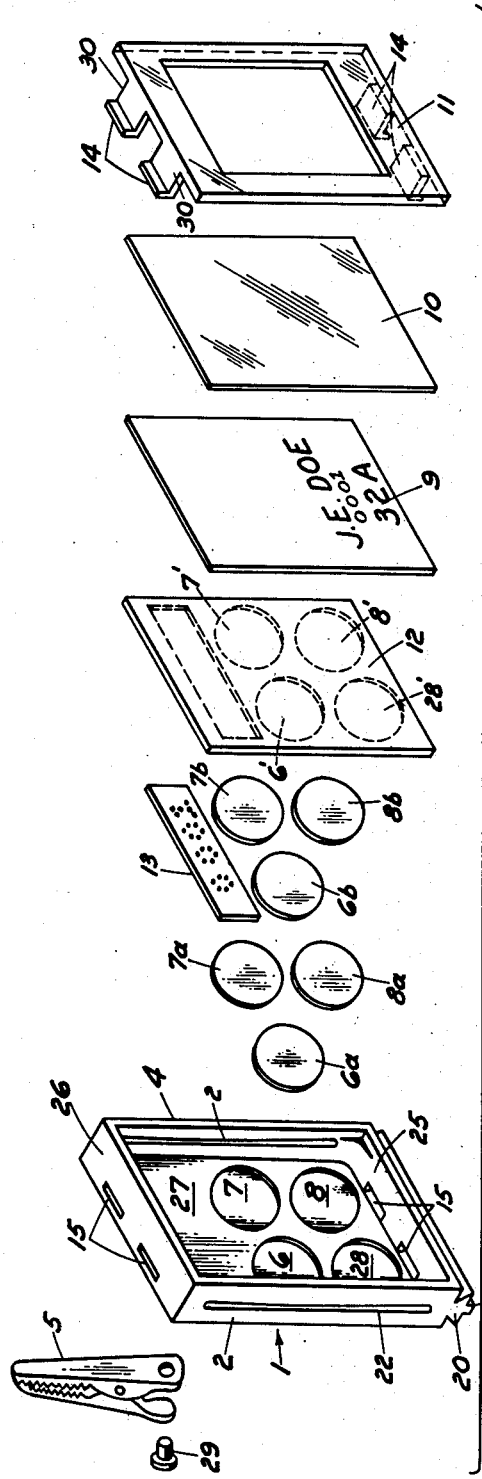
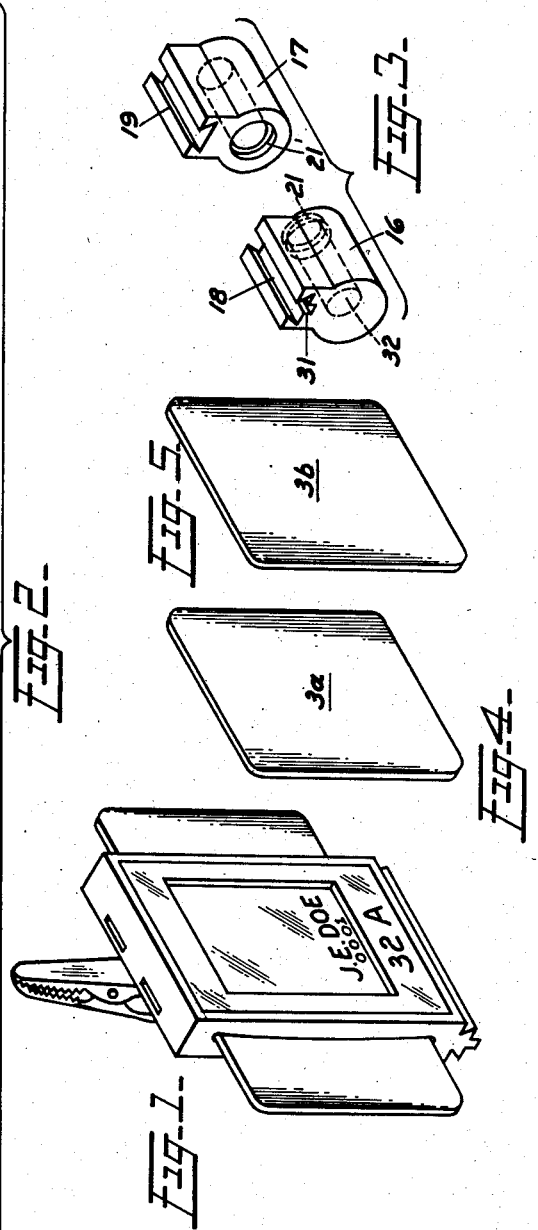
INVENTORS
Doyle M. Davis &
BY James C. Hart
ATTORNEY

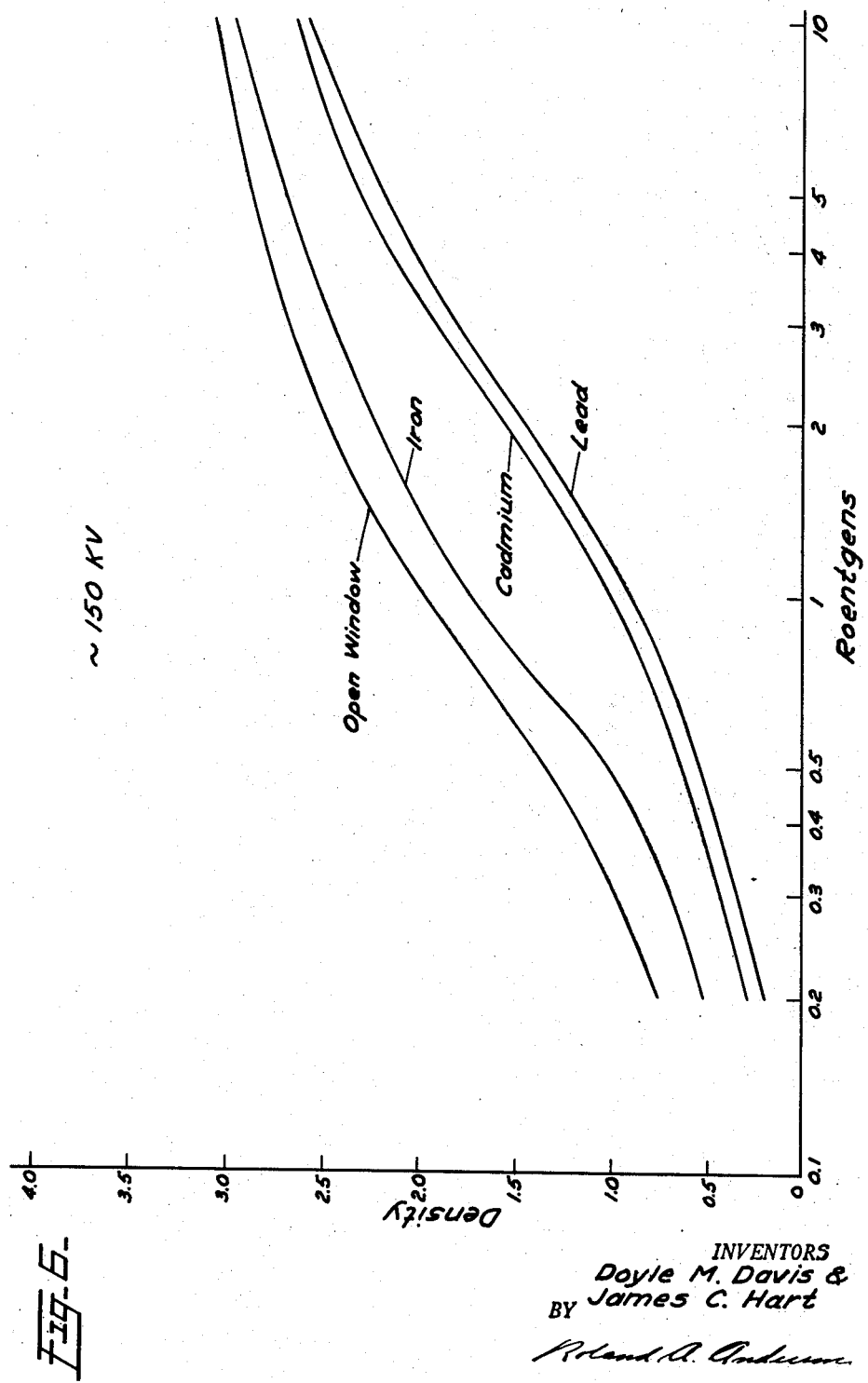

Patented Nov. 10, 1953

2,659,013

UNITED STATES PATENT OFFICE 2,659,013

BADGE METER

Doyle M. Davis, Corryton, and James C. Hart, Oak Ridge, Tenn., assignors to the United States of America as represented by the United States Atomic Energy Commission Application November 19, 1952, Serial No. 321,412

4 Claims. (Cl. 250—83)

Our invention relates to a combination badge and radiation meter, and more particularly to a badge and meter to be worn by individuals who are subjected to ionizing radiations and which is adapted to measure both the amount and intensity of the radiations to which the wearer is exposed.

Heretofore, it has generally been the practice of personnel subject to ionizing radiations, to wear at least two types of radiation detecting meters in addition to an identification badge. One type of meter ordinarily employed is similar to that disclosed in Wollan, 2,483,991, and contains one or more film packs depending upon the expected type of radiation. These film packs contain films of different sensitivities, and cadmium or other suitable filter plates are positioned on either side of portions of the film packs to filter out certain radiations and permit the film packs to respond to the energy of the radiation. The second type of radiation meter usually employed is the pocket type similar to that disclosed in Wollan, 2,536,991. It takes the form of an ionization chamber where one of the electrodes is charged to a predetermined potential. Radiation tends to ionize the sensitive volume of the chamber and the charge on the electrode gradually leaks off. Measurement of the remaining charge after a predetermined time, such as a day, serves as a measure of the radiation to which the wearer has been subjected during the period. In practice this meter is normally used in pairs to lessen the opportunity for incorrect readings when one is not operable. Since it measures relatively small radiation doses, it should be processed daily.

Not only are the above meters and badge costly, but they are also cumbersome for the wearer to keep and account for, since a substantial portion of the users after arriving at their destination or place of work change to working clothes and then change back again before leaving, necessitating a considerable amount of badge and meter handling which may result in some loss and is burdensome for the wearer. The use of a plurality of badges and meters by each individual multiplies the units to be serviced and requires an unreasonably long time and a large number of personnel to service these units. In addition, radiation dosage calculations are often in error due to inability to determine the energy of the radiation to which the meter was exposed.

Applicants with a knowledge of all of these problems in the prior art have for an object of their invention the provision of a single combination badge and radiation detection meter for indicating both the quantum of radiation and intensity of various types to which the user is being subjected.

Applicants have as another object of their invention the provision of a meter for monitoring radiation which will provide an improved estimate of radiation dosage received, by first determining the energy of radiation to which the user was subjected.

Applicants have as another object of their invention the provision of a combination badge and radiation detecting meter which will reduce to a minimum the handling and servicing necessary to secure vital information regarding radiation exposure of personnel.

Applicants have as another object of their invention the provision of a combination badge and radiation detecting meter which incorporates into a single instrument the functions of an identification medium and a radiation monitoring device capable of measuring not only intensity and quantity of gamma, beta radiation to which it was exposed, but also measures the effects of neutron exposure.

Applicants have as a further object of their invention the provision of a combination badge and radiation meter wherein the radiation sensitive packs may be quickly and easily replaced without disassembling the unit.

Applicants have as a still further object of their invention the provision of a radiation detecting meter utilizing radiation sensitive film shielded by filters covering a broad range of radiation energies.

Other objects and advantages of our invention will appear from the following specification and accompanying drawings, and the novel features thereof will be particularly pointed out in the annexed claims.

In the drawings, Fig. 1 is a perspective of our improved film badge and meter in assembled position with a film pack partially inserted. Fig. 2 is an exploded view of the same combination badge and meter. Fig. 3 is an exploded view of a detector holder for attachment to the badge or meter. Fig. 4 is a perspective of one type film pack for use in our improved invention. Fig. 5 is a perspective of a second type of film pack for use in our improved detecting device. Fig. 6 shows a representative graph of density plotted against Roentgens for 150 kv. showing the effect in air and with iron, cadmium and lead filters.

Referring to the drawings in detail, it will be seen that applicants improved badge and meter combination is comprised essentially of four principal assemblies. They include a body portion or housing 1, a closure including elements 11, 10, 9, 12, 13, 6b, 7b, and 8b, film packs 3a, 3b and a meter holder 16, 17. The body member or case 1 is box-like in configuration with sides 2, 4 and ends 25, 26 and a rear wall or bottom 27. The sides 2, 4 have elongated longitudinal slots 22, 23 for the insertion and removal of film packs to be later described. The ends 25, 26, in turn, have spaced pairs of aligned slots 15, 15 for a purpose to be later described. The back wall 27 has four circular openings 6, 7, 8, and 28 formed therein. A scissor-like spring clip 5 with serrated jaws is pivotally joined to the back of the case by a rivet and projects above the case to engage and grip some appropriate supporting surface. Depending from the lower end 25 is a dove-tailed tongue 20. This tongue is preferably coextensive with the lower end 25, and at one end thereof has a shoulder or projections 20'. This case or body is preferably made of some appropriate plastic but may be made from any suitable material. The filter discs 6a, 7a, and 8a are of different filtering materials such as cadmium, lead and electrolytic copper, respectively. The discs 6a, 7a, and 8a are preferably cemented in place in the openings 6, 7, and 8, in the rear wall 27 of case 1. However, it will be apparent that other suitable combinations of materials such as lead, cadmium, and iron may be utilized as filter discs.

The body closure or badge meter front 11 is comprised of a photograph 9, a transparent plastic photograph cover 10, a plastic frame 11 and a plastic filter holder 12. A conventional film identification index 13 is mounted on or cemented to the filter holder 12. The holder 12 has a series of circular openings 6', 7', 8', and 28' which correspond to and register with the openings in case 1. Filter discs 6b, 7b, and 8b, similar to those heretofore described, are adapted to be cemented in place in the openings 6', 7', and 8', of the holder 12. The frame 11 has two pairs of forwardly projecting fingers 30, 30 joined to its upper and lower edges. These fingers have upstanding portions 14, 14 for interlocking engagement with the walls of slots 15, 15 to retain the closure in place. Pins or rivets, not shown, may be inserted through aligned openings in holder 12, photograph 9, cover 10, and into frame 11 to anchor them thereto.

The holder 16, 17 is adapted to receive and enclose an ionization gauge or a vial of a chemical dose meter. The two parts of the holder are substantially tubular with their outer ends being closed by a wall. Dove-tailed grooves 18, 19 are formed in their outer surfaces to receive the dove-tailed tongue or spline 20 of the case 1, so as to interlock the parts of the holder with the case. Element 17 is counterbored at 21' to receive the tubular extension 21 of element 16 to provide a frictional coupling when extension 21 is telescoped within counterbore 21'. In assembling the holder, element 16 is threaded upon the right end of tongue 20 and is moved to the left until shoulder 20' seats in groove 31 and engages the inner wall (not shown) of the groove which acts as a stop. One end of the ionization gauge or chemical vial may be inserted in the socket or chamber 32 of element 16, and then the holder element 17 may be threaded on to tongue 20 until it receives the ionization gauge or vial, and has telescopic engagement with extension 21. When this takes place the ionization gauge or chemical vial is completely enclosed and the frictional coupling maintains the two parts of the holder together. The frictional coupling may be broken when it is desired to view the meter housed therein.

This improved badge meter is used in the following manner: each individual will be assigned two badge meters differing in color only. The badge meter will serve as an identification badge as well as a radiation meter, therefore, the employee will wear one of them at all times. The two are fabricated of different colored plastic so that during one week red badges will be worn, and the next week black badges will be worn. While red badges are being worn, the black ones will be processed and vice-versa so that the employee will be in possession of only one badge at a time.

The film packs 3a and 3b contain commercial film stock similar to those now in use. Film pack 3a contains emulsions that are beta-gamma sensitive over the range of about .03 Roentgen to 2500 Roentgen. The other pack 3b contains neutron sensitive films. These film packs 3a, 3b are placed within the badge body member 1 by sliding them through a slot 22 provided therefor. The packs 3a, 3b are replaced by sliding new packs through the slot 22. This pushes the old packs out through the corresponding slot 23.

Whenever the chemical dose meter or the ionization chamber indicates that the employee has received a significant dose of radiation, the film packs are removed and processed. If there is no indication of a significant dose, the film packs will be processed only on a weekly basis. In processing, the density of the film behind each of the meter discs 6, 7, 8, as well as the ratio of densities, is determined and recorded. The energy of the radiation producing the density is determined from calibration graphs. One of these graphs for 150 kv. range is shown in Fig. 6. When the approximate energy has been determined a similar graph is used to determine the radiation dosage.

It may be noted that applicants have shown four corresponding openings in the plastic holder 12 and the rear wall 27 of the case. These various openings, as heretofore indicated, are adapted to register with each other. For instance, opening 28 will register with opening 28', and since no disc is sealed therein, it will be apparent that the film packs 3a and 3b are to be subjected to radiations through that opening without any filtering so that the exposed portions of these films will not only indicate the effects of gammas and neutrons but will also be sensitive to betas. On the other hand, the various filter elements 6a, 7a, and 8a, and 6b, 7b, and 8b, seated respectively in openings 6, 7, and 8, 6', 7', and 8', serve to cover different energy ranges so as to give the various portions of the film packs 3a and 3b, which are exposed to radiations passing through these filters, a very wide energy range coverage, which has not been possible with the structures of the prior art. In this connection, it will be understood that the discs which are positioned opposite each other will be of like material. For instance, lead will be opposite lead, and cadmium opposite cadmium.

It will also be understood that some suitable vial containing an appropriate chemical may be housed in the holder 16, 17 and upon being subjected to radiations will gradually change its color, and this may be noted by simple visual examination. In lieu of a chemical vial, it is contemplated that a suitable detector or ionization chamber may be housed in the holder 16, 17 and may function in its usual manner for measuring radiation.

Having thus described our invention, we claim:

1. A radiation meter comprising a case having pairs of opposed walls, a removable closure for the case, a pair of aligned elongated slots in one of said pairs of said walls, a plurality of radiation sensitive films in overlapping super-posed position, said films being disposed within the case in alignment with said slots for removal without disengagement of the closure, and aligned filters positioned on either side of said films to limit the passage of radiation.

2. A radiation meter comprising a case having a back and pairs of opposed sides, radiation sensitive film disposed within the case, a tongue depending from one of the sides of said case, a holder having a two-part body, and a groove formed in said body for the reception of said tongue for interlocking it therewith.

3. A radiation meter comprising a case having a back and two pairs of opposite sides, a closure for the case, pairs of opposite slots in one of the pairs of sides, fingers on said closure for interlocking engagement with said slots to maintain the closure in place, a plurality of films in super-posed overlapping relation, aligned elongated slots in the other of said pairs of opposite sides whereby insertion of a new film into said case ejects an old one, and filters positioned on either side of said films for limiting the passage of radiation.

4. A badge dosimeter for use in identifying personnel and estimating the radiation dosage to which a wearer has been exposed comprising a first sheet of film particularly sensitive to gamma rays of a selected energy range contained in a light-impervious pocket, a second sheet of film particularly sensitive to gamma rays of energy outside said selected energy range, and a third sheet of film particularly sensitive to neutrons arranged in a second light-impervious pocket, a fourth sheet of film carrying a photograph of the wearer and inscribable with identifying characters, said film being pervious to gamma rays, a fifth sheet of film provided with a plurality of apertures and pervious to gamma rays; a plurality of radiation filters characterized by absorption of radiations of different energies carried in said apertures; a tray having a plurality of apertures arranged to correspond with those of said fifth sheet and adapted to receive said five sheets of film, in the order named, from top to bottom, an apertured closure member engaging said tray for holding said film sheets in place therein, and at least one support member removably attached to said tray and adapted to receive an indicating radiation monitor.

DOYLE M. DAVIS.
JAMES C. HART.

References Cited in the file of this patent

UNITED STATES PATENTS

| Number | Name | Date |
|---|---|---|
| 2,286,748 | Martin | June 16, 1942 |
| 2,387,887 | Dimsdale et al. | Oct. 30, 1945 |
| 2,496,218 | Kieffer | Jan. 31, 1950 |